3,428,462
CRACKLINGS AND PROCESS FOR
THEIR MANUFACTURE
Juan Francisco De Lara, 9433 Beverly Blvd.,
Pico Rivera, Calif. 90660
Filed Jan. 17, 1966, Ser. No. 539,596
U.S. Cl. 99—107     7 Claims
Int. Cl. A23l 1/31

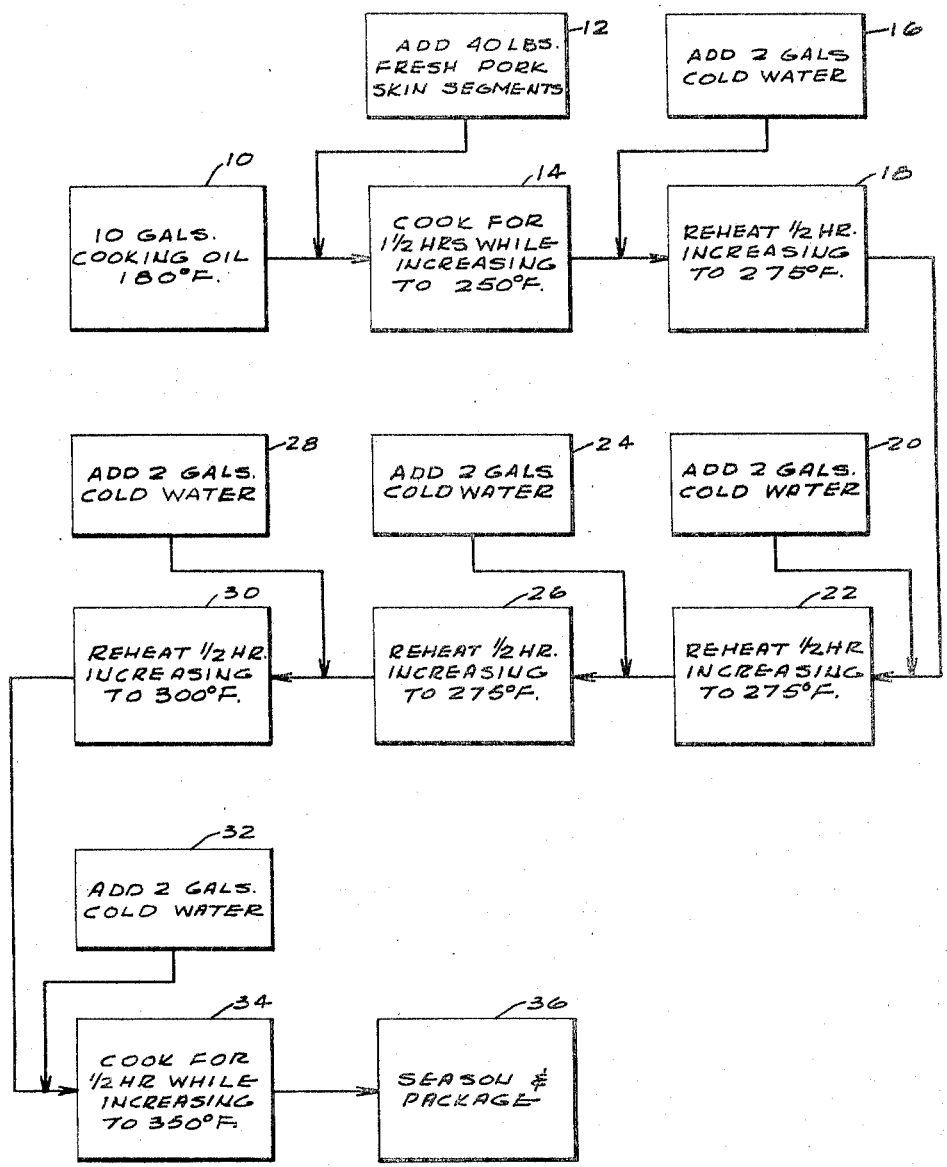

ABSTRACT OF THE DISCLOSURE

A process for making moist and tender pork cracklings by heating fresh pork skins in cooking oil to at least 200° F. to render said pork skins, adding cold water to the mixture, reheating the resulting mixture to at least 225° F., and further repeating similar reheating steps until the desired product characteristics are obtained.

---

This invention relates generally to foods and food preparation and more particularly to a modified, traditionally deep-fried product which is produced by a novel cooking process.

Although the present invention finds particularly useful application in the field of pork cracklings or *chicharrones* and although in the cause of conciseness and brevity of presentation much of the following discussion and description of examples of the invention relate thereto, it is emphasized that the advantages of the invention are equally well manifest in other fields, particularly those in which food products have been manufactured in the past by a deep-fry process as will be made more clear hereinbelow.

For centuries a delicacy known as pork cracklings have been produced and consumed by the various populations of the world whose meat fare comprised pork. Traditionally these cracklings were a substantially incidental product produced during the process of rendering lard from pork fat. This process involved the slow cooking in heated vats of the very fatty tissues near the skin of the animal; and the skin portions were at least in part not separated from their adjacent fat prior to the rendering process. Accordingly, the skins being non-renderable, separated from the fat and were incidentally thoroughly cooked in a deep-fat manner by the rendering process. During their cooking, the skin tissues become very tender and expanded and "popped" to become "crackled" or flaky and light.

As indicated above these deep-fried cracklings were traditionally enjoyed as a delicacy particularly by the families and children of the farmers who produced pork and lard for the market.

In modern times, however, the production of such cracklings has become a desired end in itself; and the business of manufacturing them with preservatives and packaging and marketing them is currently an important business in, for example, the United States and Latin countries. Typically, the process is the same as the traditional one except that the manufacturer is supplied with fresh pork skins and lard separately, the skins are cut into small portions, and then deep-fried in the lard until fully expanded or "popped." This process as generally practiced, includes, as indicated, cooking the skins under controlled conditions at very high temperatures, that is, well above the boiling point of water, until they are totally expanded. This inherently means that they are cooked until all the moisture in the skin portions is vaporized and removed. Accordingly the end product is, but for the residual cooking fat retained therein, exceeding dry. In addition to and, in part, because of being substantially totally dry, the cracklings thusly prepared are often inedibly hard or contain undetectably hard portions which are so crisp and tough as to be unpleasant to encounter while chewing. In other words their consistency is often unavoidably and harshly inconsistent.

It is accordingly an object of the present invention to provide a novel form of pork cracklings and process for their manufacture which are not subject to these and other disadvantages and limitations of the prior art.

It is another object to provide such a product which is strikingly moist.

It is another object to provide such a product which, while being of traditional flavor and crispness, is pleasantly and consistently dense and tender.

It is another object to provide such a process which is safe and relatively simple and inexpensive.

It is another object to provide such a process which is relatively non-critical while being very easily repeatable, i.e., susbtantially fool-proof in obtaining consistent results.

Very briefly these and other objects are achieved in accordance with the method aspects of the invention, in an example thereof wherein a large vat of cooking oil such as lard is heated to a low rendering temperature. Into the vat is then placed a batch of fresh pork skin segments. These are cooked at a relatively low temperature until their moisture is substantially removed and their tenderizing has begun. To the batch is then added while stirring vigorously a significant amount of water; and the temperature of the vat is increased. While the moisture has disappeared from absorption by the skins and evaporation, additional water is added and the temperature is further increased. These steps in the process are repeated until the material is fully tender and although expanded is relatively very dense from water absorption. The cooked material is then seasoned and packaged for marketing. The cooking process in this example is approximately four hours in duration with the cooking temperature increasing during the period from approximately 180° F. to approximately 350° F.

The heavy moisture content and consistent density and tender character of the cracklings provide a great deal of versatility in seasoning not heretofore possible with the traditional product. Thusly, the finished food may, when desired, be quite different from and may even be unrecognizable as pork cracklings per se. The finished product is, while being dry to the touch, quite juicy or moist while being eaten; and most importantly, the juiciness is of a pleasant, non-greasy character. These unobvious results are considered to be the result of the material being superboiled within an environment of cooking oil which is for much of the process at a temperature well above the boiling point of water.

Further details of these and other novel features and the principles of the process as well as additional objects and advantages of the invention will become apparent and be best understood from a consideration of the following description taken in connection with the accompanying drawing which is presented by way of an illustrative example only and in which the figure is a flow diagram of a cooking process example of the invention.

With specific reference now to the figure in detail, it is stressed that the particulars shown are by way of example and for purposes of illustrative discussion only and are presented in the cause of providing what is believed to be the most useful and readily understood description of the principles and method aspects of the invention. In this regard no attempt is made to show or describe process or structural details in more detail than is necessary for a fundamental understanding of the invention, the description taken with the drawing making apparent to those skilled in the culinary arts how the several forms of the invention may be embodied and achieved in practice. Specifically the detailed discussion is not to be taken as a limitation upon the scope of the invention which is defined by the appended claims forming along with the drawing a part of this specification.

In the figure, an example of the process of the invention is illustrated which includes providing a heated cooking vat 10. A quantity of, in this example, approximately 10 gallons of cooking oil, which may be lard, is disposed in the vat and heated to approximately 180° F.

Into the heated vat, a quantity of approximately 40 pounds of fresh pork skin segments 12 are then immersed. The segments may be stripped and shaped in forms desirable for packaging and consumption after the subsequent cooking process.

The vat 10 being cooled by the pork skin segments is then gradually reheated, at step 14, for a period of approximately 1½ hours while the intrinsic moisture and fats in the skin segments are removed or rendered away. During the slow rendering process the temperature of the vat is slowly increased to approximately 250° F.

At the end of the step 14 approximately 1 to 2 gallons of cold water 16 is added to the vat 10. The water is added reasonably slowly while vigorously stirring the vat. The vat being cooled to approximately 200° F. decreased by the cold water is then gradually reheated over a period of approximately ½ hour to approximately 275° F. at step 18. At this time the added moisture appears to be substantially absorbed by the skins or evaporated. Approximately 2 gallons of cold water 20 is then added, as before, to the vat 10 which causes a cooling thereof to approximately 215° F. The vat is then reheated at the step 22 over a period of approximately one-half hour again to the temperature of approximately 275° F., at which time it is apparent as before at the end of the step 18, that the added moisture has in part evaporated and in part been absorbed by the skin segments. Again approximately two gallons of cold water 24 is added and mixed with the vat 10 and again having been lowered to approximately 215° F., the vat is reheated over a period of approximately ½ hour to approximately 275° F. at step 26.

During this process of repeatedly replenishing the moisture in the vat 10 by the adding of cold water thereto, the skin segments 12 become expanded and begin to become tender and dense from the water absorption due to their disposition in the superheated moisture environment of the cooking vat 10. It may be noted that the cracklings may, accordingly, be considered as having been superboiled instead of being merely deep-fried as is traditional.

After the step 26 is achieved and the vat 10 is again reheated to approximately 275° F., another 2-gallon quantity of cold water 28 is stirred into the vat 10. This again cools the vat to approximately 215° F. At step 30 during approximately ½ hour cooking period the vat is again reheated and brought to a temperature of approximately 300° F. Then, in this example, a final 2-gallon quantity of water 32 is added in the same manner as accomplished in the previous steps. The batch cools down to approximately 250° F. and is gradually reheated at the step 34 to approximately 350° F.

The pork skin segments, being in a sense moisture-saturated, are fully expanded and cooked and are observed to be crisp, tender, and strikingly juicy. However, cold water, not shown, may again be added before the food segments are removed, drained, and packaged for marketing as indicated at a step 36.

It is emphasized that the time periods specified for the above example, the number of cycles of quenching and reheating, and the particular temperatures at each step are not deemed to be highly critical. Many variations may suggest themselves to the culinary artisan depending upon his particular application, the particular desired results, and other factors such as the condition and geometries of pork segments as well as, for example, the type of cooking oils utilized. The important aspects of the process, it is to be noted, include the repeated quenching of the hot vat with cold water whereby the cracklings are superboiled in a superheated moisture environment as set forth in detail in the above example.

There have thus been described a number of aspects and examples of novel pork cracklings and their process for manufacture which achieve the objects and exhibit the advantages set forth hereinabove.

What is claimed is:

1. A process for manufacturing pork cracklings comprising the steps of:
    placing a quantity of fresh pork skin segments and a quantity of cooking oil in a vat and heating the contents of said vat to an elevated temperature over 200° F.
    maintaining said contents of said vat at said elevated temperautre to render said pork skin segments until substantially dehydrated and expanded;
    adding a quantity of cold water to said vat and stirring the contents thereof whereby to cool the contents of said vat;
    reheating the contents of said vat to at least 225° F. and maintaining it thereat until the added moisture is substantially evaporated and absorbed; and
    repeating the steps of adding water and reheating, at least once more to complete the processing of said cracklings.

2. The invention according to claim 1 in which said repeated reheating step further includes reheating said contents to approximately 250° F. and maintaining it thereat until the added moisture is substantially evaporated and absorbed.

3. The invention according to claim 1 in which said repeated reheating step further includes reheating said contents to approximately 300° F. and maintaining it thereat until the added moisture is substantially evaporated and absorbed by said pork skin segments.

4. The invention according to claim 3 in which said repeated reheating step further includes reheating said contents to approximately 350° F. and maintaining it thereat until the added moisture is substantially evaporated and absorbed by said pork skin segments.

5. The invention according to claim 4 in which said repeated reheating and adding cold water step is continued for approximately four hours.

6. The invention according to claim 1 in which said steps of reheating said vat and adding, while stirring, cold water comprises in order:
    reheating said vat for approximately ½ hour to a temperature of approximately 275° F.;
    adding cold water while stirring said vat;
    reheating said vat for approximately ½ hour to a temperature of approximately 275° F.;
    adding cold water while stirring said vat;
    reheating said vat for approximately ½ hour to approximately 300° F.;
    adding cold water while stirring said vat;
    reheating said vat for approximately ½ hour to at least approximately 325° F.; and
    removing and packaging said segments as items of foodstuff.

7. The invention according to claim 1 in which the volume quantity of said cooking oil is approximately 10 units and the volume quantity of the cold water added in each of the repeated steps of said adding is of the order of approximately 1 to 2 units.

References Cited

UNITED STATES PATENTS 2,947,635  8/1960  Paynter et al.  _____ 99—107

A. LOUIS MONACELL, *Primary Examiner.*

W. C. LAWTON, *Assistant Examiner.*

U.S. Cl. X.R.

99—18